Sept. 28, 1926.
W. S. PEKOVICH
1,601,644
HAMMER FOR PERCUSSIVE DRILLS
Filed Feb. 4, 1921
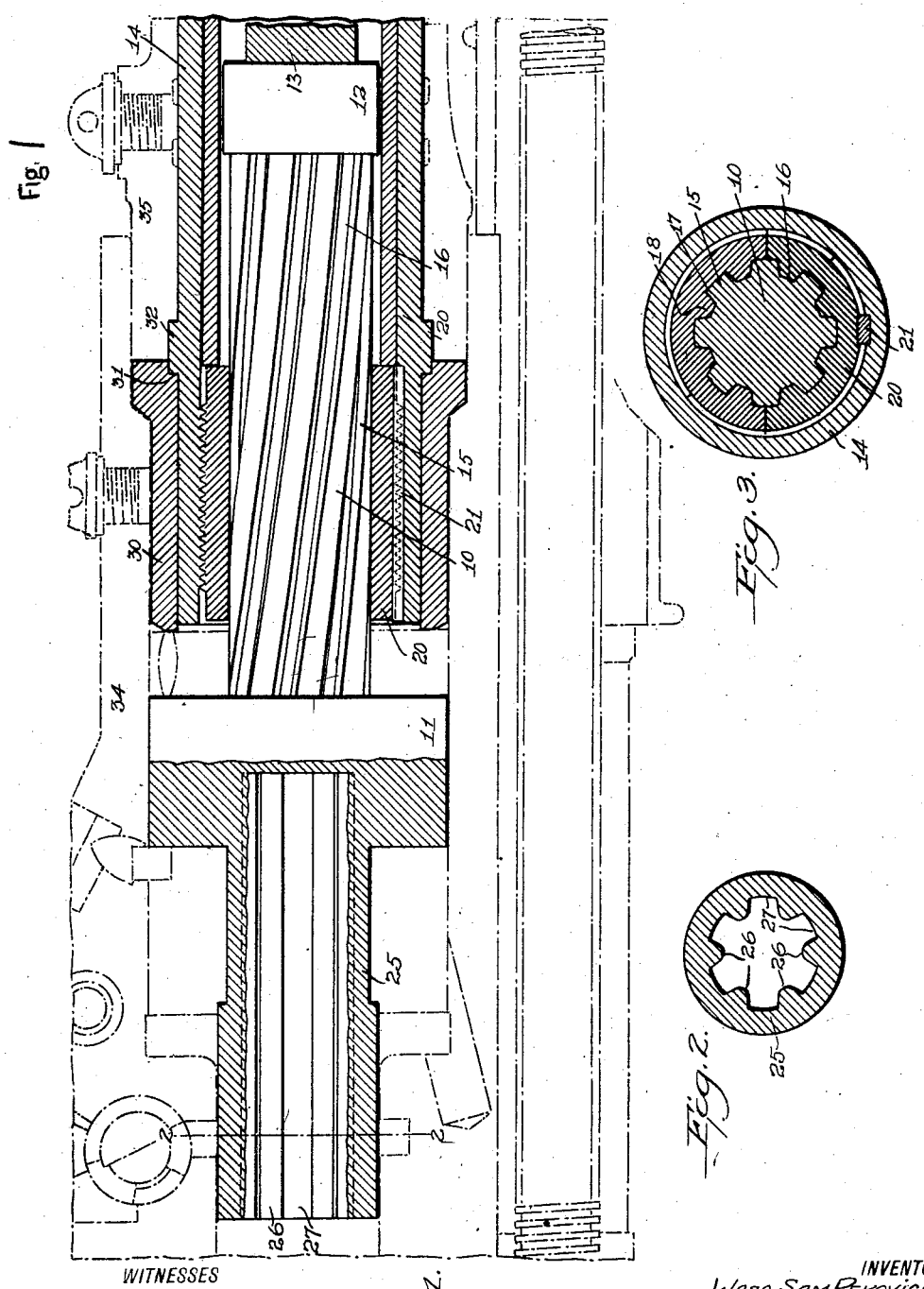
WITNESSES
INVENTOR
WASO SAM PEKOVICH
BY
ATTORNEYS Patented Sept. 28, 1926.

1,601,644

UNITED STATES PATENT OFFICE.

WASO SAM PEKOVICH, OF JUNEAU, TERRITORY OF ALASKA.

HAMMER FOR PERCUSSIVE DRILLS.

Application filed February 4, 1921. Serial No. 442,477.

The invention relates to fluid operated percussive drills, and its object is to provide a new and improved hammer for such drills arranged to permit tempering or hardening of the dolly head to any desired degree without injuring the tongues or riffles.

Another object is to prevent injury to the tongues or riffles on striking the blow.

With these and other objects in view, the invention consists of certain novel features of construction as hereinafter shown and described and then specifically pointed out in the claim.

A practical embodiment of the invention is represented in the accompanying drawings forming a part of this application, in which similar characters of reference indicate corresponding parts in all the views.

Figure 1 is a side elevation partly in section of the improved hammer for percussive drills;

Figure 2 is a cross section of the same on the line 2—2 of Figure 1; and

Figure 3 is a similar view of the same on the line 3—3 of Figure 1.

The shank 10 of a hammer is provided at one end with a piston head 11 and at the other end with a dolly head 12 adapted to strike blows onto the end of a shank 13 of the drilling tool held in a chuck 14 of usual construction. The shank 10 is provided on its peripheral surface between the dolly head 12 and the piston head 11 with spiral tongues 15 and grooves 16 engaging corresponding grooves and tongues 17, 18 formed in the inner surface of a sleeve or nut 20 screwed or otherwise secured in the chuck 14. In practice the sleeve or nut 20 is made of two parts, as indicated in Figure 3, and one of the parts is fastened by a key 21 to the chuck 14 to prevent the nut sleeve 20 from turning after being screwed in place. When the hammer 10 is in its extreme position to the left then the dolly head 12 abuts against the inner face of the sleeve or nut 20 thus limiting the movement from the right to the left of the hammer relatively to the chuck 14 and its sleeve or not 20. The hammer is provided on the left-hand face of the piston head 11 with a retaining member 25 having a recess provided in its wall with straight tongues and grooves 26, 27 adapted to be engaged by corresponding grooves and tongues on a fixed bar 25ᵃ to prevent the hammer from rotating during its reciprocating movement thus causing a back and forth turning movement of the chuck 14 and the drilling tool 13 held therein owing to the spiral tongue and groove connection between the shank 10 and the sleeve or nut 20.

It will be noticed that by the arrangement described the dolly head 12 can be tempered or hardened to any desired degree without affecting the tongues or riffles 15 thereby insuring the proper working of the shank 10 in the sleeve or nut 20.

It will further be noticed that by having the dolly head 12 abutting against the inner face of the sleeve or nut 20 on the return stroke of the hammer, the tongues or riffles 15 are protected against the blow.

On the chuck 14 is mounted a sleeve guide 30 having a rabbet 31 engaged by a collar 32 integral with the chuck 14. The rear end of the sleeve guide 30 projects beyond the rear end of the chuck into the path of the piston head 11 to allow the piston head 11 to strike the sleeve guide 30 instead of the nut sleeve 20 to prevent injury to the latter. The sleeve guide 30 is held in place in the cylinder 34 of the drill by the chuck casing 35.

Having thus described my invention, I claim as new and desire to secure by Letters Patent:—

In a percussive drill, a hammer having a shank spirally grooved for its major portion and having a rigid ungrooved tempered dolly head at the forward end of the spirally grooved portion adapted to deliver the impact of the hammer against the drill bit, said dolly head having a diameter greater than that of the spirally grooved portion of the drill head, said dolly head providing for a uniform tempering of the impact end of the hammer.

WASO SAM PEKOVICH.